United States Patent [19]

Suganuma

[11] Patent Number: 5,149,472
[45] Date of Patent: Sep. 22, 1992

[54] FUZZY INFERENCE THERMOCONTROL METHOD FOR AN INJECTION MOLDING MACHINE

[75] Inventor: Masashi Suganuma, Sakaki, Japan

[73] Assignee: Nissei Jushi Kogyo Kabushiki Kaisha, Nagano, Japan

[21] Appl. No.: 745,331

[22] Filed: Aug. 15, 1991

[30] Foreign Application Priority Data

Aug. 27, 1990 [JP] Japan .................................. 2-226359

[51] Int. Cl.$^5$ ............................................. B29C 45/78
[52] U.S. Cl. .............................. 264/40.6; 264/328.14; 425/144; 395/900; 364/476
[58] Field of Search ................. 264/40.1, 40.3, 40.4, 264/40.5, 40.6, 328.14, 328.15, 328.16; 425/135, 140, 141, 143, 144, 145, 149, 161, 162, 169, 170, 173, 542; 395/900; 364/474

[56] References Cited

U.S. PATENT DOCUMENTS

| | | | |
|---|---|---|---|
| 3,822,867 | 7/1974 | Evans | 425/144 |
| 4,094,940 | 6/1978 | Hold | 264/40.6 |
| 4,707,310 | 11/1987 | Debeaud | 264/328.14 |
| 4,841,459 | 6/1989 | Ikeda et al. | 364/476 |
| 4,899,288 | 2/1990 | Tsutsumi | 364/476 |
| 4,911,629 | 3/1990 | Fujita | 264/40.6 |
| 5,012,430 | 4/1991 | Sakurai | 395/900 |

OTHER PUBLICATIONS

Maiers and Sherif, IEEE Transaction On System, vol. SMC-15, No. 1, "Applications of Fuzzy Set Theory", Jan./Feb. 1985, pp. 175–189.

McCusker; Tom, Control Engineering, "Neural Networks and Fuzzy Logic, Tools of Promise for Controls", May 1990, pp. 84, 85.

Primary Examiner—Jill L. Heitbrink

[57] ABSTRACT

To eliminate a temperature overshoot or an undershoot during thermocontrol of thermocontrolled components, e.g. an injection cylinder, with resepct to an object temperature in each operating status of the injection molding machine, the Fuzzy Control theory is used for controlling the injection molding machine. By using the Fuzzy Control system, the object temperature of the thermocontrolled components can be attained with practically eliminated overshoot and undershoot.

10 Claims, 4 Drawing Sheets

FIG. 2A
(A) STATUS OF THE INJECTION MOLDING MACHINE
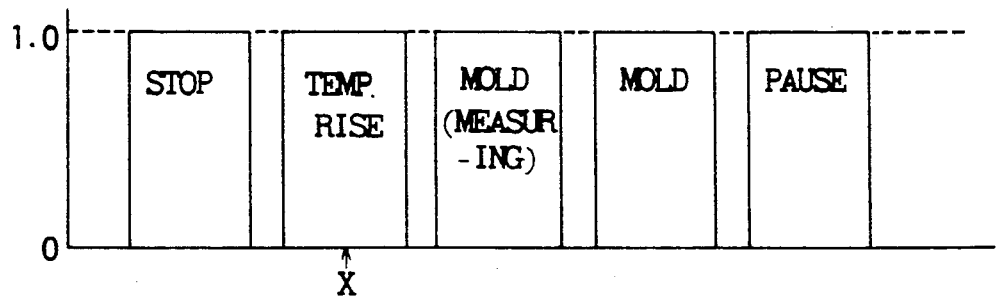
(B) TEMP. DEVIATION   FIG. 2B
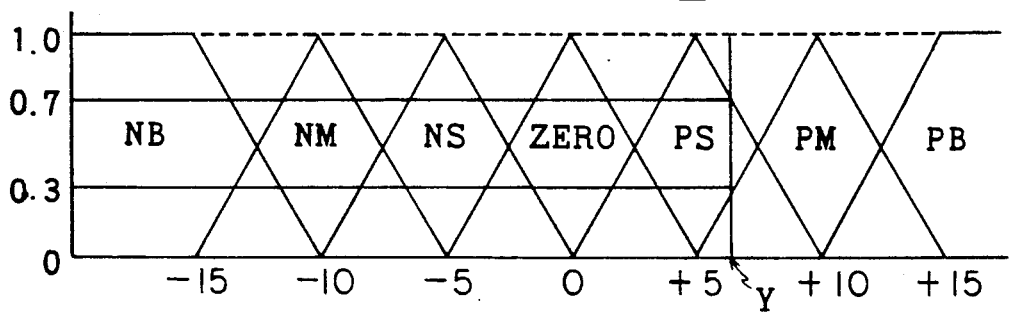
(C) RATE OF DEVIATION CHANGE   FIG. 2C
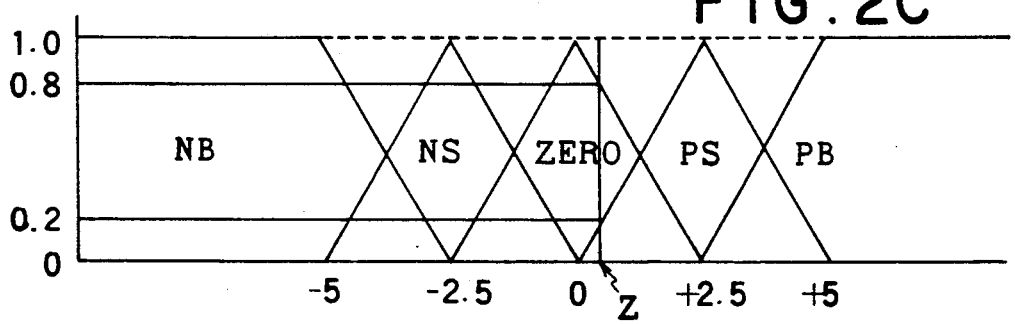
(D) CONTROL VOLTAGE
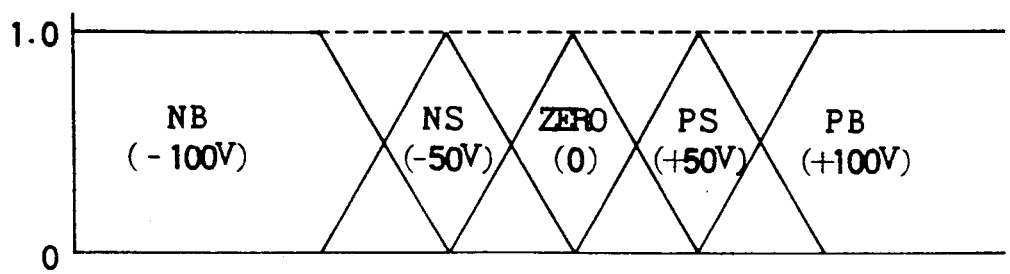
FIG. 2D

FUZZY INFERENCE THERMOCONTROL METHOD FOR AN INJECTION MOLDING MACHINE

BACKGROUND OF THE INVENTION

The present invention relates to a thermocontrol method for an injection molding machine, more precisely relates to a method for controlling temperature of thermocontrolled components, e.g. an injection cylinder, of the injection molding-machine to correspond to the instant operating status thereof.

Conventionally, PID (Proportional-Integral-Differential) control method is usually adopted to control the temperature of thermocontrolled components, e.g. an injection cylinder, of an injection molding machine.

The PID control method is based on a proportional action (P), which is in proportion to a control deviation; an integral action (I), which is based on an integrated value of the control deviation; and a differential action (D), which is based on differential coefficients of the thermocontrolled components. Using the PID control method, the object temperature can be maintained when the thermocontrolled components are under certain stable conditions.

However, the injection molding machine has various operating states such as stop, temperature rise, mold, pause, etc.. Furthermore, heating elements and cooling elements are different devices in each status. For example, in the temperature rise state, radiant heat is the main cooling element. On the other hand, heat from the heater, the heat of friction caused by an injection screw acting upon the resin, etc. are the heating elements in the mold status; while the natural radiant heat, the endothermic reaction by resin supplied, etc. are the cooling elements therein.

Therefore, in conventional PID control, the temperature of an injection cylinder, for example, may be higher (overshoot, $P_o$) or may be lower (undershoot, $P_u$) than the object temperature, as shown in FIG. 5: A Temperature Graph of the Injection Cylinder. The overshoot $P_o$ and undershoot $P_u$ of the injection cylinder have a large effect on the viscosity of molten resin, so that they may become factors in inferior production quality. Moreover, the overshoot $P_o$ causes resin deterioration when the object temperature is exceeded and the resin deterioration temperature is attained, resulting in inferior products. To avoid inferior production quality, manual control of the temperature of the injection cylinder, based on the experience of a skilled operator, is required.

SUMMARY OF THE INVENTION

An object of the present invention is to provide a thermocontrol method for an injection molding machine, which is capable of eliminating the overshoot and the undershoot with respect to the object temperature of thermocontrolled components, e.g. the injection cylinder, as much as possible and which is capable of automatically controlling the temperature of the thermocontrolled components.

To achieve the object, the inventor determined that the Fuzzy Control theory would prove effective for controlling the temperature of the thermocontrolled components, e.g. the injection cylinder, and thus created the present invention.

Namely, the thermocontrol method of the present invention, which controls thermocontrolled components to maintain an object temperature corresponding to an operating status of the injection molding machine, comprising the steps of:

detecting the operating status of the injection molding machine and the temperature of the thermocontrolled components thereof;

calculating the deviation between the object temperature of the thermocontrolled components corresponding to the present status of the injection molding machine and the present temperature detected, and the rate of deviation change between the present deviation and the previous deviation;

performing fuzzy inference to define a control value of means for heating the thermocontrolled portions and/or means for cooling the thermocontrolled components by inferring the status of the injection molding machine, the deviation calculated and the rate of deviation change, wherein the status of the injection molding machine, the temperature deviation, the rate of deviation change and the control value of the means for heating and/or the means for cooling are defined as fuzzy variables, and wherein the inference is based on rules governing a mutual relationship among membership functions and groups into which the member grades assigned to previously and optionally divided areas which correspond to respective optional values of the fuzzy variables; and calculating an actual control value of the means for heating and/or the means for cooling based on the fuzzy inference.

In the present invention, the Fuzzy Control theory is used for controlling the temperature of the thermocontrolled components such as the injection cylinder, so that changing the control value of the means for heating and cooling, which are assembled in the injection cylinder and molds, etc. can be automatically executed as if by a skilled operator. By utilizing the Fuzzy Control theory, the actual temperature of the thermocontrolled components can quickly reach the object temperature, during which period temperature overshoot and undershoot can be eliminated as much as possible.

BRIEF DESCRIPTION OF THE DRAWINGS

The present invention will become more fully understood from the detailed description give hereinbelow and the accompanying drawings which are given by way of illustration only, and thus are not limitative of the present invention and wherein:

FIG. 2 is an explanatory view showing membership functions;

DETAILED DESCRIPTION OF PREFERRED EMBODIMENT

Preferred embodiments of the present invention will now be described in detail with reference to the accompanying drawings.

Figure 1:
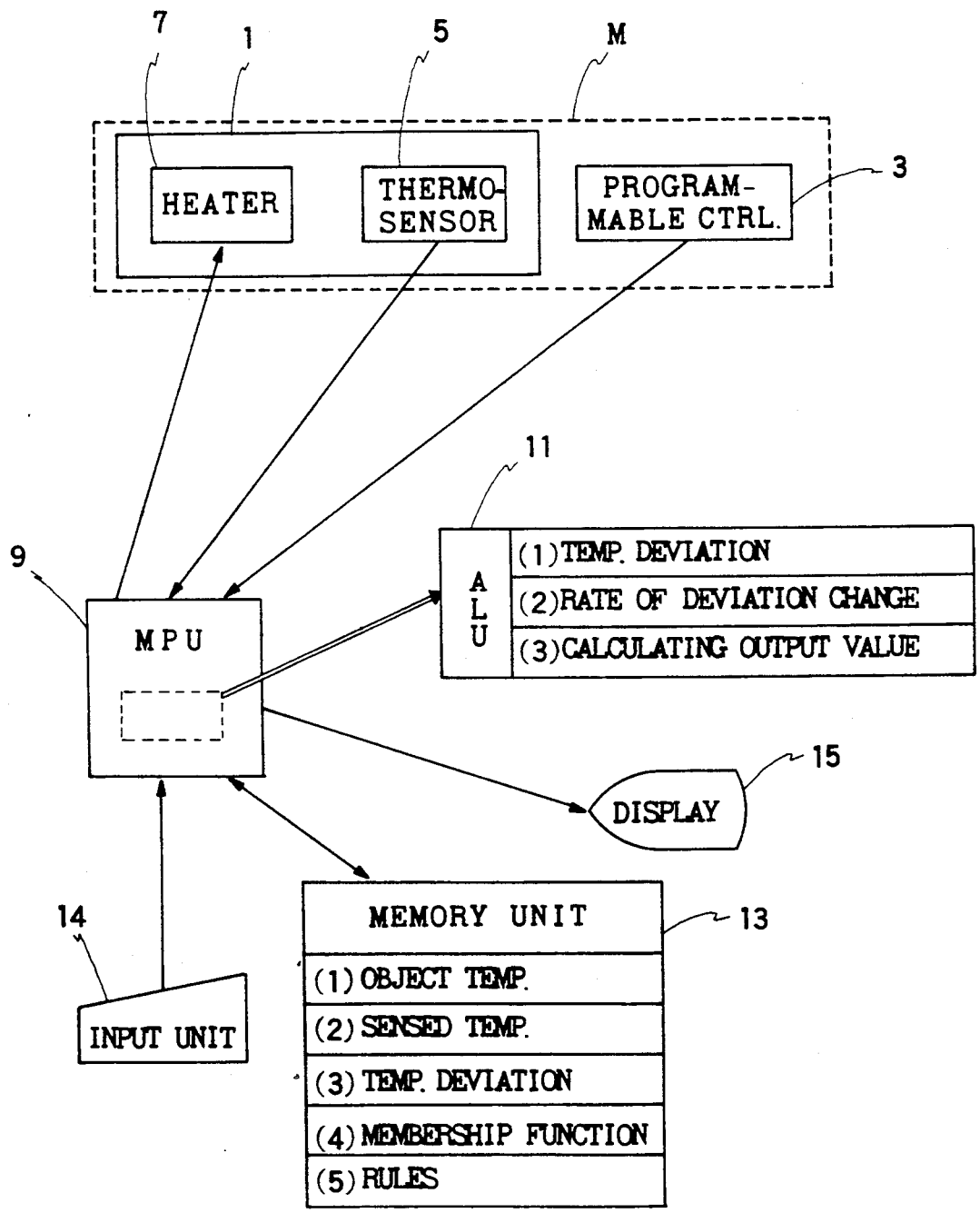
FIG. 1 is a block diagram showing an embodiment of the present invention.

FIG. 1 is a block diagram showing the present embodiment.

In FIG. 1, an injection molding machine M has an injection cylinder 1. The injection cylinder 1 has a thermosensor 5 for detecting the temperature of the injection cylinder 1 and an electric heater 7 for heating the injection cylinder 1. A rated voltage of the heater 7 is 200 V.

The status of the injection molding machine M is controlled by a programmable controller 3, so that each state, e.g. stop, temperature rise, mold, pause, etc., of the injection molding machine M is initiated by the data from the programmable controller 3. The sensor 5 and the heater 7 may be the same as those which are conventionally used for injection molding machines. Note that, the injection cylinder 1 excludes a nozzle portion, which comes into contact with molds.

Signals from the controller 3 are sent to a microprocessor (MPU) 9 to indicate the present operating status of the injection molding machine M: temperature rise, mold, pause, etc.

The object temperature of the injection cylinder 1 corresponding to the present operating state (A) of the injection molding machine M, which is known by the MPU 9, is defined on the basis of temperature data stored in an area (1) of a computer memory 13.

Signals indicating the detected temperature from the sensor 5 of the injection cylinder 1 are also sent to the MPU 9 and written in an area (2) of the memory 13. Temperature deviation (B) between the object temperature, which has been defined on the basis of the signals from the controller 3, and the detected temperature, which is detected by the sensor 5, is calculated by an arithmetic logical unit (ALU) 11 in the MPU 9, and written in an area (3) of the memory 13.

Additionally, the ALU 11 calculates the rate of deviation change (C), which is the change rate between the present temperature deviation—the latest data—and the previous temperature deviation, which has been stored in the area (3) of the memory 13. The value (A) indicating the status of the injection molding machine M, the temperature deviation (B) and the rate of deviation change (C) will be data for the fuzzy inference, which is based on membership functions and rules, described later.

Then, the control value of the heater 7 is calculated on the basis of fuzzy inference by the ALU 11. The calculated control value is sent to the heater 7 as control signals by the MPU 9. The above stated sequence, from reading data to sending control signals, will be continuously repeated. Note that, the contents of the memory 13 can be shown on a display unit 15, e.g. CRT, and can be corrected with an input unit 14, e.g. keyboard.

The membership functions for each fuzzy variable have been stored in an area (4) of the memory 13 (see FIG. 2). The fuzzy variables are: the value (A) indicating the status of the injection molding; the temperature deviation (B); the rate of deviation change (C); and the degree of output for operation (E), i.e. control voltage, of the heater 7.

Each membership function is divided into a plurality of groups including or excluding mutual overlapped sectors. Each group has been respectively assigned a grade (0–1).

The membership function for the fuzzy variable (A) is divided into five distinct groups. The grades of the groups are "0" or "1". The membership function for the fuzzy variable (B) is divided into seven groups with overlapped sectors. Five groups of the seven are graphically depicted as triangles. In the graph, temperature change is indicated along the horizontal axis—the base edge of the overlapping triangular groups—and is defined in 10° C. increments which correspond to the length of each triangular group's base edge.

The membership function for the fuzzy variable (C) is divided into five groups with overlapped sectors. Three groups of the five are also graphically depicted as triangles. In the triangular groups, the rate of deviation change at the base edge is defined in 5° C. increments which correspond to the length of each triangular group's base edge.

The heater 7, whose rated voltage is 200 V, is controlled by inputting 100 V plus or minus the control voltage. Thus, the membership function whose fuzzy variable is the degree of output for operation (E), i.e. the control voltage, is graphically divided into five overlapping sectors whose points of intersection delineate 50 V increments. Three groups of the five are graphically shown as triangles.

The relationship among the groups of each membership function is defined by a rule previously stored in an area (5) of the memory 13. A rule for temperature rise status, as an example, is shown in the following TABLE, in which the labels NB, NS, NM, NS, etc. are arbitrary names given various operating states:

TABLE

| No. | if INPUT | | | then OUTPUT |
| --- | --- | --- | --- | --- |
| | A | B | C | E |
| 1 | TEMP. RISE | NB | NB | PB |
| 2 | TEMP. RISE | NB | NS | PB |
| 3 | TEMP. RISE | NB | ZERO | PB |
| 4 | TEMP. RISE | NB | PS | PB |
| 5 | TEMP. RISE | NB | PB | PB |
| 6 | TEMP. RISE | NM | NS | PB |
| 7 | TEMP. RISE | NM | PS | PS |
| 8 | TEMP. RISE | NM | PS | PS |
| 9 | TEMP. RISE | NM | PB | PS |
| 10 | TEMP. RISE | NM | PB | PS |
| 11 | TEMP. RISE | NS | NB | PB |
| 12 | TEMP. RISE | NS | NS | PS |
| 13 | TEMP. RISE | NS | ZERO | PS |
| 14 | TEMP. RISE | NS | PS | ZERO |
| 15 | TEMP. RISE | NS | PB | ZERO |
| 16 | TEMP. RISE | ZERO | NB | PS |
| 17 | TEMP. RISE | ZERO | NS | PS |
| 18 | TEMP. RISE | ZERO | ZERO | ZERO |
| 19 | TEMP. RISE | ZERO | PS | NS |
| 20 | TEMP. RISE | ZERO | PB | NS |
| 21 | TEMP. RISE | PS | NB | PS |
| 22 | TEMP. RISE | PS | NS | ZERO |
| 23 | TEMP. RISE | PS | ZERO | ZERO |
| 24 | TEMP. RISE | PS | PS | NS |
| 25 | TEMP. RISE | PS | PB | NB |
| 26 | TEMP. RISE | PM | NB | NS |
| 27 | TEMP. RISE | PM | NS | NS |
| 28 | TEMP. RISE | PM | ZERO | NB |
| 29 | TEMP. RISE | PM | PS | NB |
| 30 | TEMP. RISE | PM | PB | NB |
| 31 | TEMP. RISE | PB | NB | NB |
| 32 | TEMP. RISE | PB | NS | NB |
| 33 | TEMP. RISE | PB | ZERO | NB |
| 34 | TEMP. RISE | PB | PS | NB |
| 35 | TEMP. RISE | PB | PB | NB |

In the TABLE, the INPUTs A, B and C in the "if" column respectively indicate the fuzzy variables (A), (B) and (C). On the other hand, the OUTPUT E in the "then" column indicates the fuzzy variables (E). In the horizontal direction of the TABLE, for example in row 1, the relationship among the INPUTs A, B and C is logical "AND"; in the vertical direction thereof, for example, the relationship between row 1 and row 2 is logical "OR". Note that, there are shown in the TABLE all combinations of all the groups in the membership function, but combinations impossible or very rare may be omitted from the TABLE.

Next, the fuzzy inference for defining the input voltage to the heater 7 will be explained. Note that, this case will be explained under the following conditions: the variable (A), Operating Status, is X (temperature rise); the variable (B), Latest Temperature Change, is Y (groups PS and PM); and the variable (C), Latest Rate of Change is Z (ZERO and PS).

Figure 3:
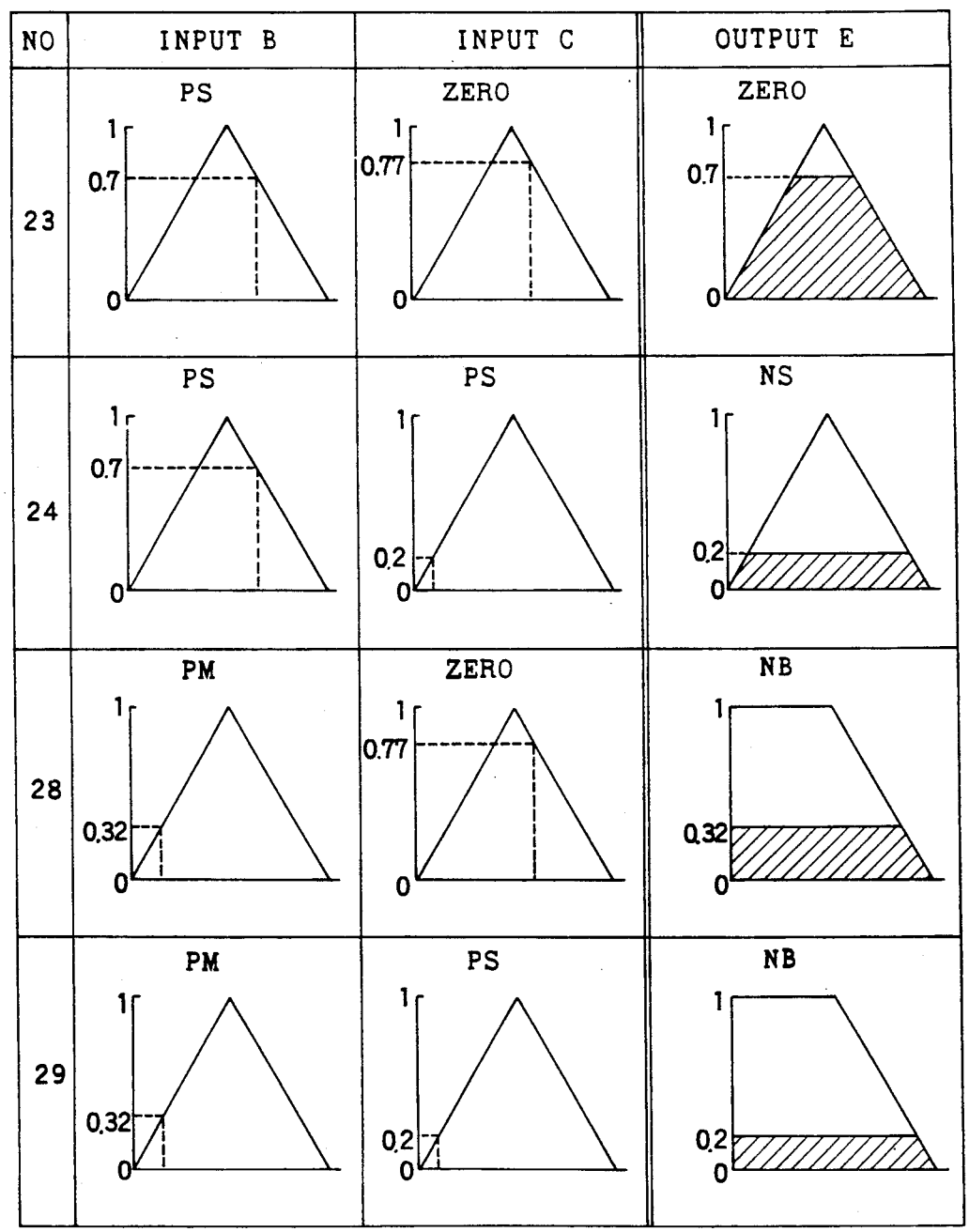
FIG. 3 is an explanatory view showing examples of Fuzzy inference.

In the position Y of the variable (B), the groups "PS" and "PM" are overlapped; in the position Z of the variable (C), the groups "ZERO" and "PS" are overlapped. Therefore, combinations of the INPUTs A, B and C result in four rules, which are shown in FIG. 3 as rules No. 23, 24, 28 and 29. The relationship among the INPUTs A, B and C in each rule is logical "AND", so that the OUTPUT E will infer a range including the INPUTs A, B and C. Namely, the range of the OUTPUT E is shown as area which is partitioned by minimum input values of the INPUTs A, B and C, marked by the shaded area in FIG. 3.

The actual control voltage to the heater 7 is calculated by the ALU 11 on the basis of the inferred OUTPUTs E of the rules.

The steps of the calculation will be explained.

Figure 4:
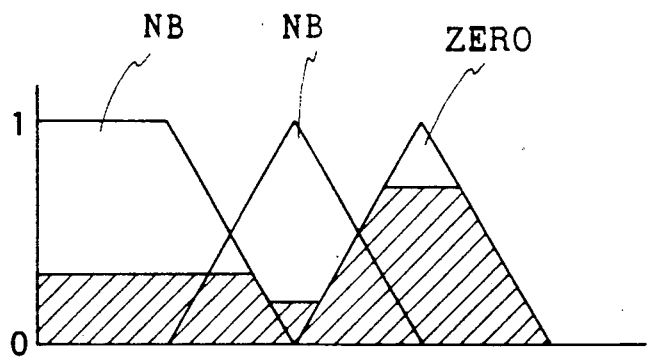
FIG. 4 is an explanatory view showing the steps of calculating control values.

First, the inferred range, which is marked by shading (see FIG. 3), of each OUTPUT E is composed as shown in FIG. 4.

Next, the centroid of the inferred range in FIG. 4 is determined and the control voltage for the heater 7 is calculated.

Figure 5:
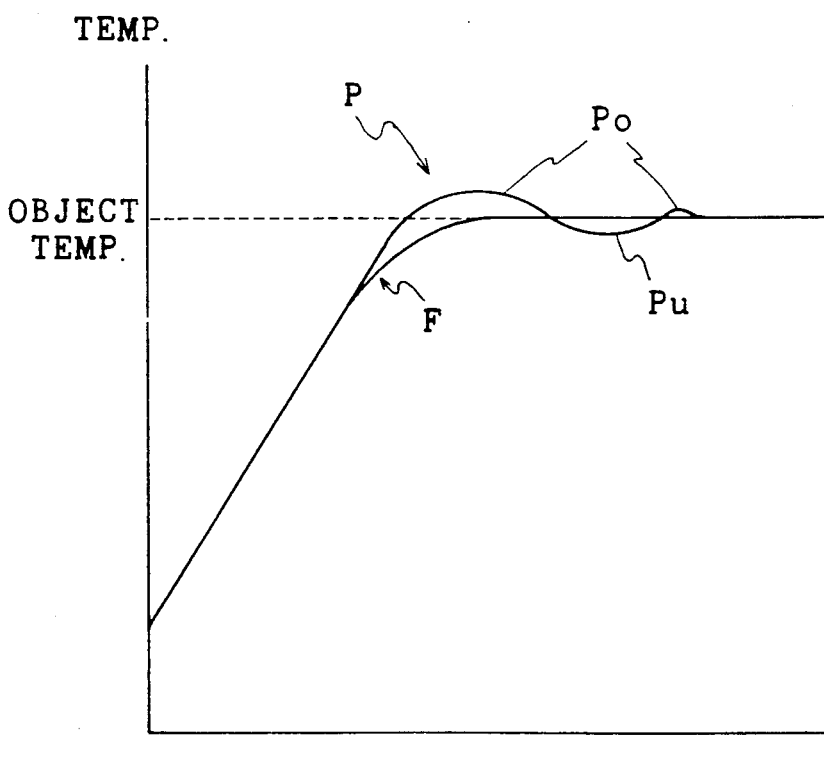
FIG. 5 is a graph showing the temperature control of the injection cylinder.

Utilizing the above described Fuzzy Control theory, temperature overshoot $P_o$ and undershoot $P_u$ (see the graph F in FIG. 5) in the injection cylinder 1 can be eliminated, and the temperature of the injection cylinder 1 is automatically adjusted to correspond to the object temperature of the instant operating state of the injection molding machine M. Furthermore, inferior production can be prevented. Even in cases of using a resin with low thermostability, no manual control by experienced operators is required.

Note that, in the present embodiment, new membership functions, e.g. a deviation between the current rate of change and previous rate thereof, may be added to the membership functions shown in FIG. 2.

In the present embodiment, an injection nozzle, which may be provided to the front end of the injection cylinder, may also be controlled utilizing the Fuzzy Control theory as applied to the injection cylinder.

Furthermore, the injection cylinder and the nozzle may have a plurality of heaters, which are arranged longitudinally and each heater may be controlled on the basis of the fuzzy inference. In this case, the temperature can be very precisely controlled.

The temperature of the molds also needs precise control, so they too may be controlled on the basis of the fuzzy inference.

There are provided means for heating, e.g. an electric heater, and means for cooling, e.g. a water circulation pipe, in some molds. In this case, the means for heating and cooling may be controlled on the basis of the fuzzy theory, so that the overshoot and the undershoot can be eliminated as much as possible. Thus, an unskilled operator using a preprogrammed Fuzzy Control system is capable of controlling the temperature of the molds as if he were a skilled operator.

In the present invention, the temperature of the thermocontrolled components is capable of automatically adjusting to the object temperature corresponding to the operating status of the injection molding machine. During the aforedescribed automated thermocontrol, overshoot and undershoot are eliminated as much as possible. Therefore, the present invention contributes to the effective operation of injection molding machines and to the reduction of inferior molded products.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thermocontrol method for an injection molding machine so as to control thermocontrolled components to maintain an object temperature corresponding to an operating status of the injection molding machine, comprising the steps of:

detecting the operating status of the injection molding machine and the temperature of the thermocontrolled components thereof;

calculating the deviation between the object temperature of the thermocontrolled components corresponding to the present status of the injection molding machine and the present temperature detected, and the rate of deviation change between the present deviation and the previous deviation;

performing fuzzy inference to define a control value of means for heating the thermocontrolled portions or means for cooling the thermocontrolled components by inferring the status of the injection molding machine, the deviation calculated and the rate of deviation change, wherein the status of the injection molding machine, the temperature deviation, the rate of deviation change and the control value of the means for heating or the means for cooling are defined as fuzzy variables, and wherein the inference is based on rules governing a mutual relationship among membership functions and groups into which the member grades assigned to previously and optionally divided areas which correspond to respective optional values of the fuzzy variables;

calculating an actual control value of the means for heating or the means for cooling based on the fuzzy inference; and controlling the temperature of the means for heating or the means for cooling with the actual control valve.

2. The thermocontrol method for an injection molding machine according to claim 1,
   wherein the thermocontrolled components are an injection cylinder or molds.

3. The thermocontrol method for an injection molding machine according to claim 2,
   wherein the injection cylinder includes an injection nozzle provided to an end thereof.

4. The thermocontrol method for an injection molding machine according to claim 1,
   wherein the fuzzy inference is respectively applied to each thermocontrolled component.

5. The thermocontrol method for an injection molding machine according to claim 1,
wherein each membership function is divided into a plurality of groups which have mutually overlapping sectors when the membership functions are graphically depicted.

6. The thermocontrol method for an injection molding machine according to claim 5,
wherein the overlapped sectors are triangular when graphically depicted.

7. The thermocontrol method for an injection molding machine according to claim 1,
wherein the status of the injection molding machine is controlled by a programmable controller.

8. The thermocontrol method for an injection molding machine according to claim 1,
wherein the means for heating is an electric heater.

9. The thermocontrol method for an injection molding machine according to claim 1,
wherein the means for cooling is a water circulation pipe.

10. The thermocontrol method for an injection molding machine according to claim 1,
wherein the membership functions and the rules are previously stored in a memory unit of a computer.

* * * * *